Figure 1:
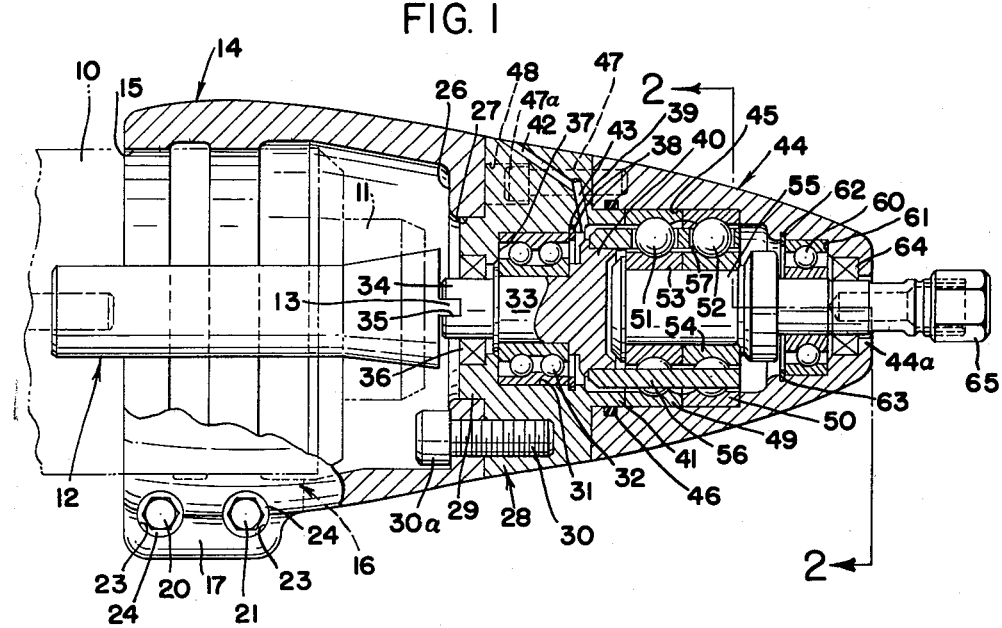

April 9, 1963

M. HOLDER 3,084,570

MACHINE TOOL SPEED STEP-UP DRIVE ATTACHMENT

Filed July 2, 1959

INVENTOR
MANFRED HOLDER

BY

ATTORNEY

United States Patent Office 3,084,570
Patented Apr. 9, 1963

3,084,570
MACHINE TOOL SPEED STEP-UP
DRIVE ATTACHMENT
Manfred Holder, 4150 Hough Ave., Cleveland, Ohio
Filed July 2, 1959, Ser. No. 824,494
4 Claims. (Cl. 74—798)

This invention pertains to the art of machine tools and more particularly to an attachment for machine tools for increasing the speed thereof.

The present invention is particularly adapted for attachment to milling machines or drill presses and will be described with particular reference thereto although it will be appreciated that it may be equally applied to other types of machine tools, such as lathes or the like.

In the art of machine tools, it is often desirable to have a spindle speed greater than the maximum spindle speed of which the machine tool is capable. This is particularly true where a large size machine tool is required to effect machining operations using small diameter cutting tools, for example, where a large milling machine in a model or die shop is required to be used to make small, intricate dies. Thus, when the small cutting tool, such as a milling cutter, is rotated at the maximum spindle speed of the machine tool excessively long machining times are required.

The present invention is particularly directed to this problem and contemplates an attachment for machine tools which enables greatly increased spindle speeds while still being able to maintain a rigid support for the spindle and cutting tool.

In accordance with the present invention, an attachment for machine tools is provided comprised of a housing rotatably supporting on aligned axes a drive shaft and a driven shaft with a speed step-up mechanism therebetween, the driven shaft having means for rotatably supporting a cutting tool and the driving shaft having means for coacting with the spindle of the machine tool. The housing includes a recess coaxial with the shaft axes for receiving and clampingly engaging the quill of the machine tool. This portion of the housing can, if desired, be detachable from the remainder of the housing to form an adaptor unit so that the same mechanism can be selectively used on various type machine tools having different quill sizes.

It is an object of this invention to provide a novel and improved speed step-up drive attachment for a milling machine or other machine tool.

It is also an object of this invention to provide such an attachment which may be readily mounted on or removed from the machine tool on which it is used.

Another object of this invention is to provide such an attachment which does not require any alteration in the basic construction and mode of operation of the machine tool on which it is used.

Another object of this invention is to provide a novel speed step-up drive attachment for a machine tool which may be readily applied to a maximum number and variety of machine tools.

Figure 2:
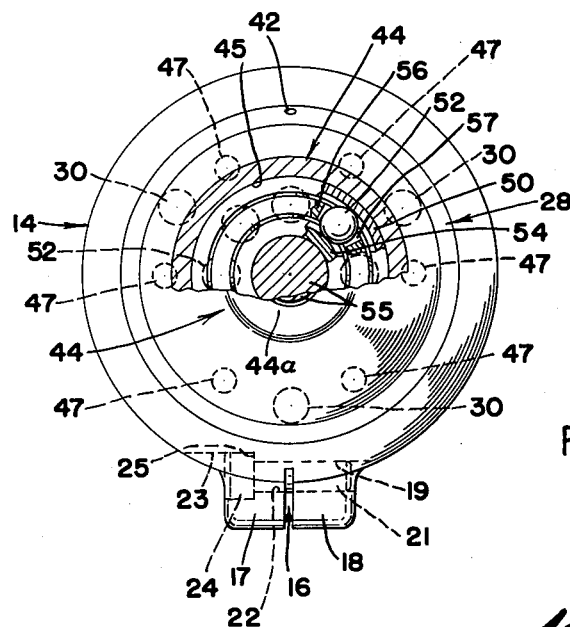

Further objects and advantages of the present invention will be apparent from the following detailed description of a presently-preferred embodiment thereof which is illustrated in the accompanying drawing which is a part hereof and wherein:

FIGURE 1 is a view partly in side elevation and partly in section, showing the attachment of the present invention mounted on a milling machine; and FIGURE 2 is a view taken along the line 2—2 in FIGURE 1 and showing in section a part of the mechanism in the front housing and also showing the remainder of the front housing in end elevation.

Referring to the drawing, the quill of a milling machine is shown in phantom lines in FIGURE 1 and is designated by the reference numeral 10. As shown in FIGURE 1, this quill 10 is substantially cylindrical and at its right end rotatably supports a hollow spindle 11 of conventional construction. A special arbor 12 is supported by and detachably coupled in any suitable manner to the spindle 11 so as to be driven thereby. This special arbor replaces the usual arbor which holds the milling cutter. The special arbor 12 extends forwardly beyond the front end of the spindle 11 and at its front extremity carries a forwardly projecting diametrically extending lug 13.

In accordance with the present invention, there is provided an attachment for the milling machine having a housing which includes an adapter 14. This adapter is in the form of an axially elongated split ring which defines a central, axially extending recess 15 which is shaped and dimensioned to snugly, but slidably, receive the quill 10 when the adapter is inserted thereon. Such insertion may be done by positioning the back end of the adapter 14 at the front end of the quill 10 and sliding the adapter rearward along the quill until it assumes the position shown in FIGURE 1. As best seen in FIGURE 2, at its lower end the adapter 14 is formed with a radial slit 16 which extends from the outer periphery of the adapter into the central recess 15 therein. At its lower end the adapter is formed with a pair of spaced apart, downwardly protruding legs 17 and 18 which are located on opposite sides of the slit 16. The leg 18 is formed with a pair of spaced apart, screw threaded openings 19 which threadedly receive the inner ends of screws 20 and 21. The leg 17 is formed with bores 22 which register respectively with the threaded openings 19 in the other leg 18. A counterbore 23 extends inward from the periphery of the adapter 14 at the leg 17 to each bore 22 therein. The enlarged head 24 on each screw 21 engages the shoulder 25 which is formed at the juncture between each counterbore 23 and the corresponding bore 22.

With this arrangement, when the adapter 14 is slipped endwise onto the quill 10, the bolts 21 are loosened, so that the recess 15 in the adapter 14 is slightly larger than the outside circumference of the quill. After the adapter has been positioned on the quill as shown in FIGURE 1, the bolts 20, 21, are turned to clamp the opposite legs 17 and 18 together, thereby clamping the adapter 14 tightly on the quill 10.

As best seen in FIGURE 1, the adapter 14 at its right end presents an inturned radial flange 26. This flange 26 extends around a central opening 27 which leads into the recess in the adapter 14. The right face of this flange 26 is disposed forwardly a short distance beyond the front end of the lug 13 on the arbor 12.

The housing also includes a main housing 28 releasably attached to the front end of the adapter 14. As shown in FIGURE 1, this main housing 28 has a reduced diameter rear or left hand extension 29 which is snugly, but slidably, received in the opening 27. The main portion of the housing 28 lies flush against the front face of the flange 26. Three evenly and circumferentially spaced bolts 30 attach the housing 28 to the front flange 26 of the adapter 14. As shown in FIGURE 1, each of these bolts 30 has its threaded insertion end threadedly received in the housing 28 and its enlarged head 30a engaging the back face of the flange 26 on the adapter 14.

As shown in FIGURE 1, the external surface of the housing 28 is of tapered configuration, forming a smooth continuation of the outer surface of the adapter 14.

The housing 28 is formed with a central axial recess 31 at which a ball bearing assembly 32 is located. A driver shaft 33 is rotatably supported by this ball bearing assembly. This driver shaft has a reduced diameter rear extension 34 which presents a rearwardly facing slot 35 which snugly receives the forwardly projecting lug 13 on the arbor 12. A suitable seal 36 is provided between the housing 28 at the latter's back end and the reduced diameter extension 34 of the driver shaft.

The housing 28 a short distance forward from its rear end presents a forwardly facing annular shoulder 37 against which one end of the ball bearing assembly 32 abuts. A retaining ring 38 seated in a groove 39 in the housing 28 engages the front end of the ball bearing assembly 32 to retain it in place in the housing 28.

Forwardly of the ball bearing assembly, the driver shaft 33 presents an enlarged head portion 40. This enlarged head portion 40 extends into a forwardly protruding, reduced diameter segment 41 of the housing 28.

A pair of bores 42 and 43 which respectively extend from the exterior of the housing 28 and from the central axial recess 31 therein intersect each other to provide a vent for the escape of the oil and/or vapors when running temperatures increase.

In accordance with the present invention, a front housing 44 is provided which is releasably attached to the front or right of the housing 28. As shown in FIGURE 1, the exterior surface of the front housing 44 tapers inwardly from back to front and forms a smooth continuation of the exterior surface of the housing 28.

The front housing 44 is provided with a central axial recess 45 at its back end which snugly, but slidably, receives the outside of the reduced diameter front extension 41 of the housing 28, an O-ring 46 being provided thereat to constitute a seal between these members.

Six bolts 47 are provided for releasably attaching the front housing 44 to the housing 28. As shown in FIGURE 1, each of these bolts has its threaded insertion end threadedly received in the front housing 44, while its enlarged head 47a is seated in a counterbore 48 in the housing 28, this counterbore 48 being open at the back face of the housing.

The central recess 45 in the front housing receives a ball bearing assembly which constitutes an epicyclic transmission. As shown in FIGURE 1, this ball bearing assembly comprises outer races 49 and 50 which are disposed in end-to-end relationship and which have a press fit in the bore 45 so that they are held stationary therein. A series of balls 51 and 52 are engaged frictionally between these outer races and correspondingly positioned inner races 53 and 54. The inner races rotatably support a driven shaft 55. A generally cylindrical coupling member 56 is formed with circumferentially spaced slots 57 which receive the balls 51 and 52. This coupling member 56 is brazed to the head 40 on the driver shaft 33 so that it rotates in unison with the driver shaft. As the coupling member 56 rotates, it carries with it the balls 51 and 52 engaged frictionally between the stationary outer races 49, 50 and the corresponding inner races 53 and 54.

Toward its front end, the front housing 44 carries a suitable ball bearing assembly 60 which provides a rotatable support for the driven shaft 55. This ball bearing assembly is engaged between a rearwardly facing annular shoulder 61 formed on the front housing 44 and a retaining ring 62 seated in a groove 63 in the front housing.

A suitable seal 64 is carried by the front housing 44 just forward of the ball bearing assembly 60. The front end of the driven shaft 55 extends forwardly beyond an inturned flange 44a at the front end of the front housing 44. A chuck 65 is attached to the front end of the driven shaft 55 in front of the flange 44a on the front end of the front housing. This chuck has provision for detachably receiving an arbor or other cutting tool support which is to be driven at high speed by the speed step-up drive.

From the foregoing it will be apparent that the illustrated embodiment of the present invention constitutes a novel speed step-up drive attachment which may be readily mounted on a conventional milling machine, drill press or other machine tool without requiring any permanent modification of the latter's basic construction and mode of operation. When so mounted the present attachment constitutes an effective arrangement for stepping up the speed at which a milling cutter, drill bit or other cutting tool is driven. When it is desired to operate the milling cutter, drill bit or other cutting tool in the usual manner at relatively slow speed, the present attachment may be removed readily.

Also, by bolting on different adapters, the same mechanisms may be employed on a maximum number of different types and sizes of machine tools at a minimum of expense.

While there has been described in detail herein and illustrated in the accompanying drawing a specific presently-preferred embodiment of this invention, it is to be understood that various modifications, omissions and refinements which depart from the disclosed embodiment may be adopted without departing from the spirit and scope of this invention.

Having thus described my invention, I claim:

1. A speed step-up drive attachment for a machine tool which has a housing and a power driven member rotatably mounted in one end of said housing, said attachment comprising an adapter shaped and dimensioned to be slipped over said end of said housing, means on said adapter for clamping it tightly onto said housing, said adapter having an inturned flange defining an aperture coaxial with said driven member, said flange extending axially beyond said driven member when said adapter is clamped in place on said housing, a drive housing means having a boss and a central transmission chamber, said boss adapted to be slidably received in said aperture of said adapter, said central chamber adapted to receive and hold a step-up drive having an input shaft extending through said boss and outward from said drive housing means and an output shaft, said shafts being coaxial with respect to each other, means for connecting said input shaft onto said driven member, means for connecting said output shaft onto a cutting tool, and means for releasably securing said drive housing means onto said adapter.

2. A speed step-up drive attachment for a machine tool which has a housing having a cylindrical end and a power driven member which is rotatable at said end of said housing, said attachment comprising a generally annular adapter having a central axial chamber shaped and dimensioned to slidably receive said end of the housing, said adapter having a lengthwise slit therein and spaced portions on opposite sides of said slit, bolts interconnecting said spaced portions and adapted to be turned to clamp said spaced portion toward one another and thereby tighten the adapter on the housing, said adapter at its outer end having an inturned transverse annular flange which partially closes that end of the central chamber in the adapter and having an axial opening thereat which leads from said central chamber, said axial opening registering with said power driven member, drive housing means having a boss detachably bolted to said flange and extending outward therefrom, said boss coaxial with said opening to align said drive housing means with said power driven member, and a speed-up drive rotatably mounted in said drive housing means and having its inner end extending into said axial opening in the outer end of the adapter, said speed-up drive having means on its inner end for releasable connection to said power driven member to be driven thereby.

3. A speed step-up drive attachment for a machine tool which has a housing and a power driven arbor member which is rotatable in said housing at one end thereof, said attachment comprising an adapter shaped and dimensioned to be slipped onto said one end of the housing, means on said adapter for clamping it tightly on the housing after being slipped thereon, a rear housing releasably attached to the outer end of said adapter and extending outward therefrom, a front housing releasably attached to the outer end of said rear housing and extending outward therefrom, said adapter and said rear and front housings having axial chambers therein which are aligned and which communicate with one another, said axial chamber in the adapter receiving the outermost end of said arbor member, and a speed step-up drive comprising a driver shaft which is rotatably supported in said axial chamber in the rear housing, said driver shaft at its inner end extending into said axial chamber in the adapter and having means thereat for releasable attachment to said outermost end of said arbor member, a driven shaft rotatably supported in said axial chamber in the front housing, a ball bearing arrangement comprising an inner race on the driven shaft, an outer race fixedly mounted on the front housing at said axial recess therein, and a plurality of balls frictionally engaged between the inner and outer races, and a coupling member connected to the driver shaft to rotate therewith and engaging the balls to cause the balls to revolve inside the outer race as the driver shaft rotates.

4. A friction speed step-up drive attachment for a machine which has a housing and a power driven arbor member rotatable in said housing at one end thereof, said attachment comprising an adapter shaped and dimensioned to be slipped onto said one end of said housing, said adapter having an aperture coaxial with said arbor member, a drive means housing releasably mounted onto said adapter, said drive means housing having coaxial driving and driven shafts extending from opposite ends of said drive means housing, said driving shaft extending through said adapter and connected to said power driven arbor, means for aligning said housing means with said aperture so that said driving shaft is coaxial with said arbor member, said driven shaft extending from said drive means housing and receiving a cutting tool holder, and a friction drive means in said drive means housing, said friction drive means comprising an outer race secured rigidly to said drive means housing, an inner race secured rigidly to said driven shaft, intermediate spaced rotating friction elements, and a friction element carrier secured rigidly to said driving shaft.

References Cited in the file of this patent
UNITED STATES PATENTS

| | | |
|---|---|---|
| 1,372,045 | Sedgewick | Mar. 22, 1921 |
| 1,680,306 | Stewart | Aug. 14, 1928 |
| 2,152,517 | Whitney et al. | Mar. 18, 1939 |
| 2,428,049 | Tate | Sept. 30, 1947 |
| 2,447,424 | Nightingale | Aug. 17, 1948 |
| 2,484,605 | Boucher | Oct. 11, 1949 |
| 2,826,095 | Dirzius et al. | Mar. 11, 1958 |
| 2,844,968 | Schwab | July 29, 1958 |

FOREIGN PATENTS

| | | |
|---|---|---|
| 433,177 | Great Britain | Aug. 9, 1935 |
| 1,163,949 | France | May 4, 1958 |